(12) United States Patent  (10) Patent No.: US 8,089,710 B2
Schüttinger  (45) Date of Patent: Jan. 3, 2012

(54) STAND MAGNIFIER

(75) Inventor: Alfred Schüttinger, Heroldsbach (DE)

(73) Assignee: A. Schweizer GmbH Optische Fabrik, Forchheim (DE)

( * ) Notice: Subject to any disclaimer, the term of this patent is extended or adjusted under 35 U.S.C. 154(b) by 25 days.

(21) Appl. No.: 12/523,581

(22) PCT Filed: Jan. 15, 2008

(86) PCT No.: PCT/DE2008/000054
§ 371 (c)(1),
(2), (4) Date: Oct. 27, 2009

(87) PCT Pub. No.: WO2008/086780
PCT Pub. Date: Jul. 24, 2008

(65) Prior Publication Data
US 2010/0067125 A1  Mar. 18, 2010

(30) Foreign Application Priority Data
Jan. 17, 2007 (DE) .......................... 10 2007 003 303

(51) Int. Cl.
G02B 27/02 (2006.01)
(52) U.S. Cl. ........................................ 359/802; 359/803
(58) Field of Classification Search ........... 359/802–803
See application file for complete search history.

(56) References Cited

U.S. PATENT DOCUMENTS

| | | | | |
|---|---|---|---|---|
| 5,087,112 A * | 2/1992 | Feinbloom | ................... | 359/800 |
| 5,267,716 A * | 12/1993 | Friedman | ................... | 248/291.1 |
| 6,154,302 A * | 11/2000 | Yagi et al. | ................... | 359/198.1 |
| 6,553,626 B2 * | 4/2003 | Coburn | ................... | 16/386 |
| 2002/0051304 A1 * | 5/2002 | Jung | ................... | 359/802 |
| 2006/0120090 A1 * | 6/2006 | Wikle et al. | ................... | 362/396 |
| 2006/0171045 A1 * | 8/2006 | Carnevali | ................... | 359/802 |

FOREIGN PATENT DOCUMENTS

| | | |
|---|---|---|
| DE | 100 20 715 A1 | 9/2001 |
| DE | 201 22 490 U1 | 11/2005 |
| DE | 200 23 758 U1 | 2/2006 |

OTHER PUBLICATIONS

Form PCT/ISA/210, "International Search Report", mailed Jun. 24, 2008 for PCT/DE2008/000054, (9 pgs).
Form PCT/ISA/237, "Written Opinon of the EP Searching Authority" for PCT/DE2008/000054 (10 pgs).
Form PCT/ISA/237, "Written Opinion of the International Searching Authority," for PCT/DE2008/000054, English Translation, (11 pages).

* cited by examiner

Primary Examiner — Ricky Mack
Assistant Examiner — Vipin Patel
(74) Attorney, Agent, or Firm — Maldjian Law Group LLC; John P. Maldjian, Esq.

(57) ABSTRACT

A stand magnifier is provided, comprising a magnifier base to be placed on reading material or any other surface to be inspected, namely a contact surface, and a magnifier element having a grip and a magnifying body disposed on one grip end, with the magnifier element being detachably attached to the magnifier base and being pivotable relative to the contact surface when the magnifier base is attached, wherein the magnifier base is designed in at least two parts having at least first and second magnifier base parts mounted one inside the other in a light-tight fashion, and the magnifier element is designed as a separately usable hand magnifier and the grip is formed such that it touches the contact surface with its free grip end region.

27 Claims, 6 Drawing Sheets

STAND MAGNIFIER

CROSS-REFERENCE TO RELATED APPLICATIONS

This application claims the benefit of International Application PCT/DE2008/000054, filed on Jan. 15, 2008 and published as WO/2008/086780, which in turn claims the benefit of German patent application 10 2007 003 303.8, filed on Jan. 17, 2007.

BACKGROUND

Field of the Invention

The invention/innovation relates to a stand magnifier comprising a magnifier base to be placed on reading material or any other surface to be inspected, namely a contact surface, and a magnifier element having a grip and a magnifying lens that is disposed on one end of the grip. The magnifying element with the grip disposed thereon may be used as a separately usable hand magnifier.

Hand magnifiers provided with a magnifier base are known from the prior art, cf. DE 201 22 490 U1.

DE 200 23 758 U1 discloses a magnifying optical system connected to a power source, with the lighting element being embodied as a high-power LED. The above-mentioned document further discloses that the free end of the grip of the hand magnifier is supported via a bearing on the contact surface.

SUMMARY

The object of the invention/innovation is to further develop a stand magnifier having the features described in the pre-characterizing portion of Claim 1 such that it unites the advantages of a stand magnifier with those of a hand magnifier. The further object of the invention is to guarantee secure and comfortable handling of the stand magnifier and particularly to increase comfort when using the magnifier on flat surfaces.

The core of the invention/innovation is seen as the fact that the hand magnifier is detachably attached to the magnifier base. By detachably attaching the hand magnifier to the magnifier base, it becomes possible for the advantages of a hand magnifier (low weight, low overall volume) to be combined with the advantages of a stand magnifier (hands-free observation of an enlarged object or reading material) in one embodiment. This saves the user from needing to acquire both individual types of magnifiers because he will be able to find the advantages of both in the present embodiment.

If the magnifier base is not transparent or if the stand magnifier according to the invention is used on a surface that is not illuminated from below, it is advantageous for the stand magnifier to be designed with its own light source. This light source may comprise, for example, an incandescent bulb or preferably an LED or high-performance LED. This allows the illumination function to be integrated when using the hand magnifier detached from the magnifier base as well as in the operating mode as a stand magnifier (combination of hand magnifier and magnifier body).

It has been shown to be particularly advantageous for the hand magnifier to be mounted such that it may be pivoted relative to the contact surface when the magnifier base is attached. This mounting must not necessarily occur at the coupling point between the hand magnifier and the magnifier base; rather, in a preferred embodiment, it is realized inside the magnifier base. If the pivot axis runs approximately centrally through the magnifier base and/or is disposed directly over the contact surface, a pivot function may be implemented in a simple manner that is comfortable for the user.

The pivotable design of the magnifier base allows the magnifier body to be oriented in a manner corresponding to the user's angle of view, thus increasing the user comfort of the stand magnifier.

It is advantageous for the detachable connection between the hand magnifier and the magnifier base to be realized by means of a snap-lock connection. As an alternative that may be used alone but also in combination with a snap-lock connection, a plurality of magnets coupled such that they are mutually attracted may form a secure and comfortably detachable connection between the hand magnifier and the magnifier base. Preferably, two to six magnet pairs are placed that are disposed on the two pieces to be connected, for example, equidistantly and/or symmetrically to the pivot axis. In this manner, the attachment and detachment of the two pieces to be connected may be conducted in a comfortable and reliable fashion using simple hand grips.

In addition, the invention proposes that the magnifier base be embodied of at least two pieces, for example, two magnifier base parts that are movable relative to one another and that are stored one inside the other in an essentially light-tight fashion. In more concrete terms, this may be achieved using magnifier base parts in the shape of a spherical cap. By dividing the magnifier base in two, the pivot function is shifted into the magnifier base in a simple fashion. The light tightness between the movable magnifier base parts is advantageous if the lateral incursion of ambient light is to be prevented so that the lateral incursion of ambient light does not impair the observation of the contact surface.

In addition, it is advantageous for at least two magnifier base parts that are movable relative to one another to be at least partially pivotable one inside the other in a planar fashion. On the one hand, such a planer contact may be advantageous in that it supports the light tightness of the magnifier base and, on the other hand, by placing the frictional forces acting on the contact points or surfaces in a targeted fashion, the contact between two magnifier base parts may be used to allow pivoting of the two parts only after the application of a defined amount of force. In the refinement of this feature, it is useful for the pivoting of the two magnifier base parts for locking elements to be disposed on at least one magnifier base part. Using such a locking element, the two magnifier base parts may be locked into defined pivoted positions relative to one another. This measure is advantageous, for example, when the stand magnifier according to the invention must be operated by a shaky hand because the vibrations of the shaky hand are not transferred to the pivotable movement of the magnifier base parts.

In a structurally simple embodiment, the pivot axis of the two magnifier base parts is formed or defined by pins and counter means on the respective magnifier base parts that are pivotable relative to one another. In addition, the invention proposes that the pivoting ability of the two magnifier base parts be structured such that the magnifier base is pivotable in at least two directions, originating from a parallel position between the contact surface and the magnifier body. Thus, pivoting the stand magnifier towards the user may be achieved independently of whether the user is holding the grip of the magnifier in the left or right hand.

Moreover, it has proven to be favorable for various features to be taken into account on the coupling regions between the hand magnifier and the magnifier base, for example, that a recess is provided on the upper edge of the magnifier base that corresponds to a placement area of the hand magnifier. An additional measure would be, for example, to form an annular collar on the upper edge of the magnifier base that corresponds to an opposing region of the hand magnifier. These two measures allow the hand magnifier to be combined more easily with the magnifier base because the recess and/or annular collar, along with the respective corresponding regions, has a self-centering effect.

In addition, it should also be mentioned that the illumination means disposed on the hand magnifier illuminates the contact surface through the recess of the magnifier when the hand magnifier and magnifier base are combined, thus ensuring a simple, cost-effective, and reasonable arrangement of the LED because it is usable when operated in the combined stand magnifier mode and in the hand magnifier mode.

Furthermore, it has been shown to be particularly advantageous for the grip of the magnifier base to be formed in such a way that it touches the contact surface with its free grip end region. By placing the grip end region of the grip on the contact surface, the stand magnifier may be used in a comfortable fashion because any vibrations (caused by shaky hands) would have less of an effect on the "stationary" stand magnifier.

If the stand magnifier has a pivot function, it is useful for the grip end of the grip disposed on the magnifier body to be disposed or supported in the plane of the contact surface in an unwinding fashion. In this context, "unwinding" means that the grip end region is formed such that, corresponding to the pivot ability, it forms at least one contact point and/or contact line over the entire pivot motion. An additional measure for achieving a stable stance of the stand magnifier is to support at least the edge region of an additional pivotable magnifier base part on the contact surface in at least one pivot position next to the lowermost magnifier base part. Such a pivot position may, for example, be a final rest position.

If the stand magnifier comprises an illumination means operated by rechargeable battery or power supply, it is advantageous for a power jack to be provided for inserting a charging plug or power supply cable. This charging plug jack may be disposed, for example, on the free grip end; it is important to ensure that a charging plug inserted does not hinder the unwinding of the grip end on the contact surface during the pivoting of the stand magnifier. This is achieved, for example, in that the power jack is opposite the magnifier body with its central longitudinal axis and points upwards (diagonally upwards).

In the preferred embodiment, the base has a round basic shape, with the grip extending radially outwards. In addition, provision may be made for the central longitudinal axis of the grip to be disposed parallel to the pivot axis and to be flush therewith when viewed from above.

In a second alternative embodiment, the magnifier base has a rectangular shape, wherein the central longitudinal axis of the grip forms an acute angle with the pivot axis or is disposed parallel to the pivot axis.

If the central longitudinal axis of the grip forms an acute angle with the pivot axis, it is advantageous for the grip end to rest on the contact surface when the hand magnifier is tilted and to float when in a second position (magnifier body positioned parallel to the contact surface) (distance between the handle end and contact surface).

BRIEF DESCRIPTION OF THE DRAWINGS

The invention shall be described in greater detail below with reference to exemplary embodiments shown in the drawings, which show.

DETAILED DESCRIPTION

Figure 1:
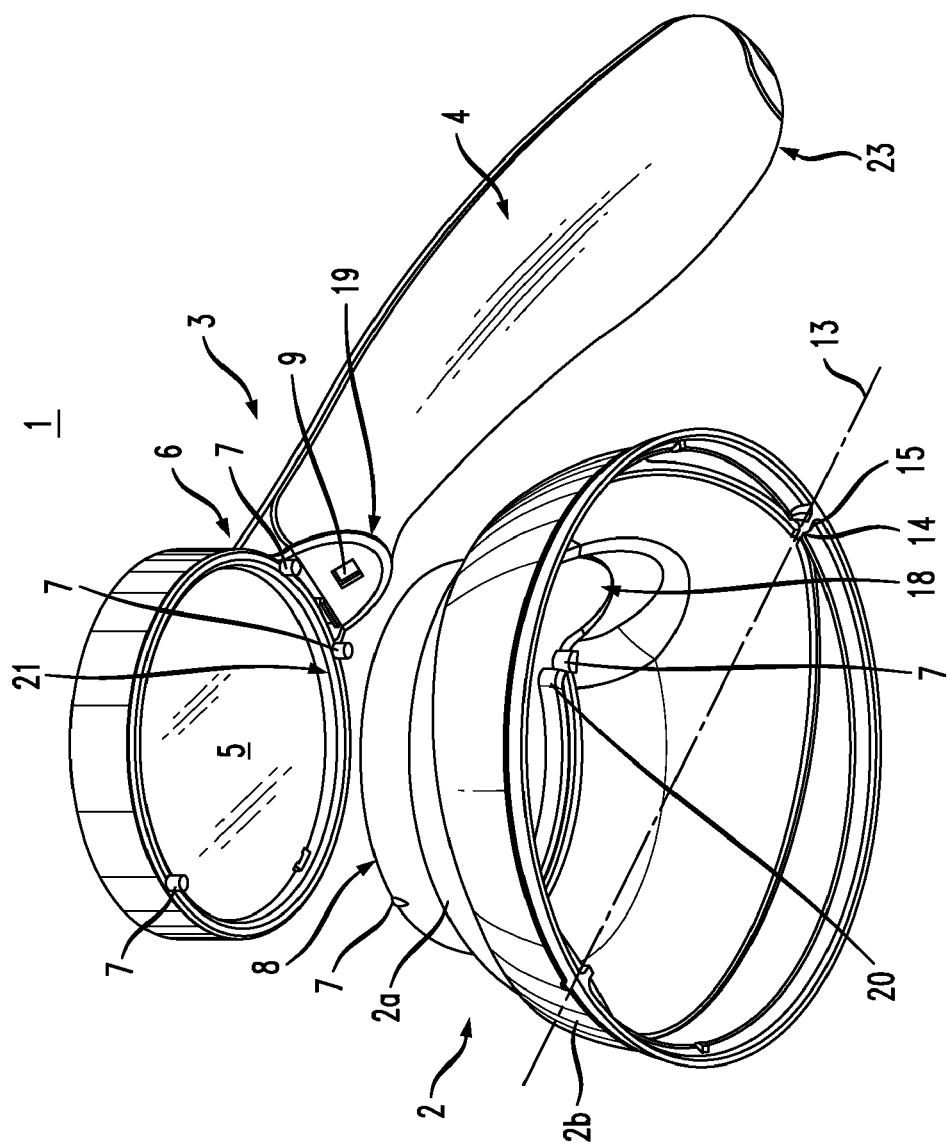
FIG. 1 a perspective view of a stand magnifier when the hand magnifier and magnifier base have been decoupled.

FIG. 1 shows a stand magnifier 1 that may be assembled from a magnifier base 2 and a magnifier element 3. The magnifier element 3 comprises a grip 4 and a magnifier body 5 disposed on one grip end 6. The magnifier element 3 is connected in a detachable fashion to the magnifier base 2, thus forming a hand magnifier. The terms "hand magnifier 3" and "magnifier element 3" are used as synonyms in this context. The detachable connection between the magnifier base 2 and the hand magnifier 3 may be formed buy a plurality of mutually attracted coupled magnets 7 in the edge region 8 of the magnifier body 5. In the preferred embodiment, three magnet pairs 7 are used. The magnets 7 may also be admitted in the edge region of the frame of the magnifier body in a flush manner. Alternately, the detachable connection may also be realized in the form of a snap-lock connection or a combination of a snap-lock connection and a plurality of magnets 7 coupled in a mutually attracting fashion.

Figure 2:
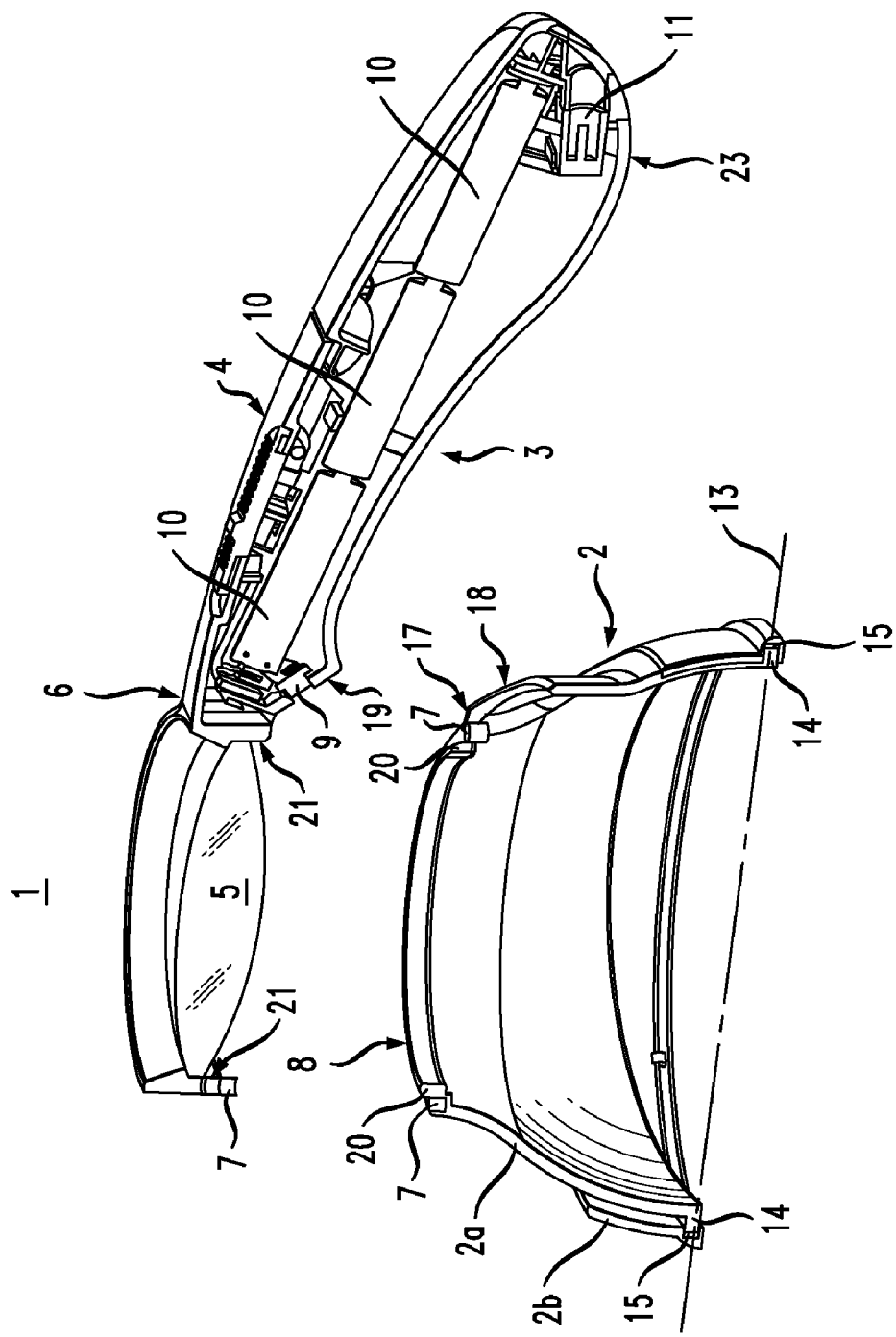
FIG. 2 a perspective sectional view of a stand magnifier as shown in FIG. 1

In the preferred embodiment, the hand magnifier 3 is provided with an illumination means 9. As is shown in FIG. 2, the illumination means 9 is supplied with power with the aid of rechargeable batteries or batteries 10. If rechargeable batteries 10 are used, they may be connected to a power supply via a charging jack 11 and charged. Moreover, providing a power supply to the illumination means 9 directly via a power supply connection is also in accordance with the invention.

Figure 3:
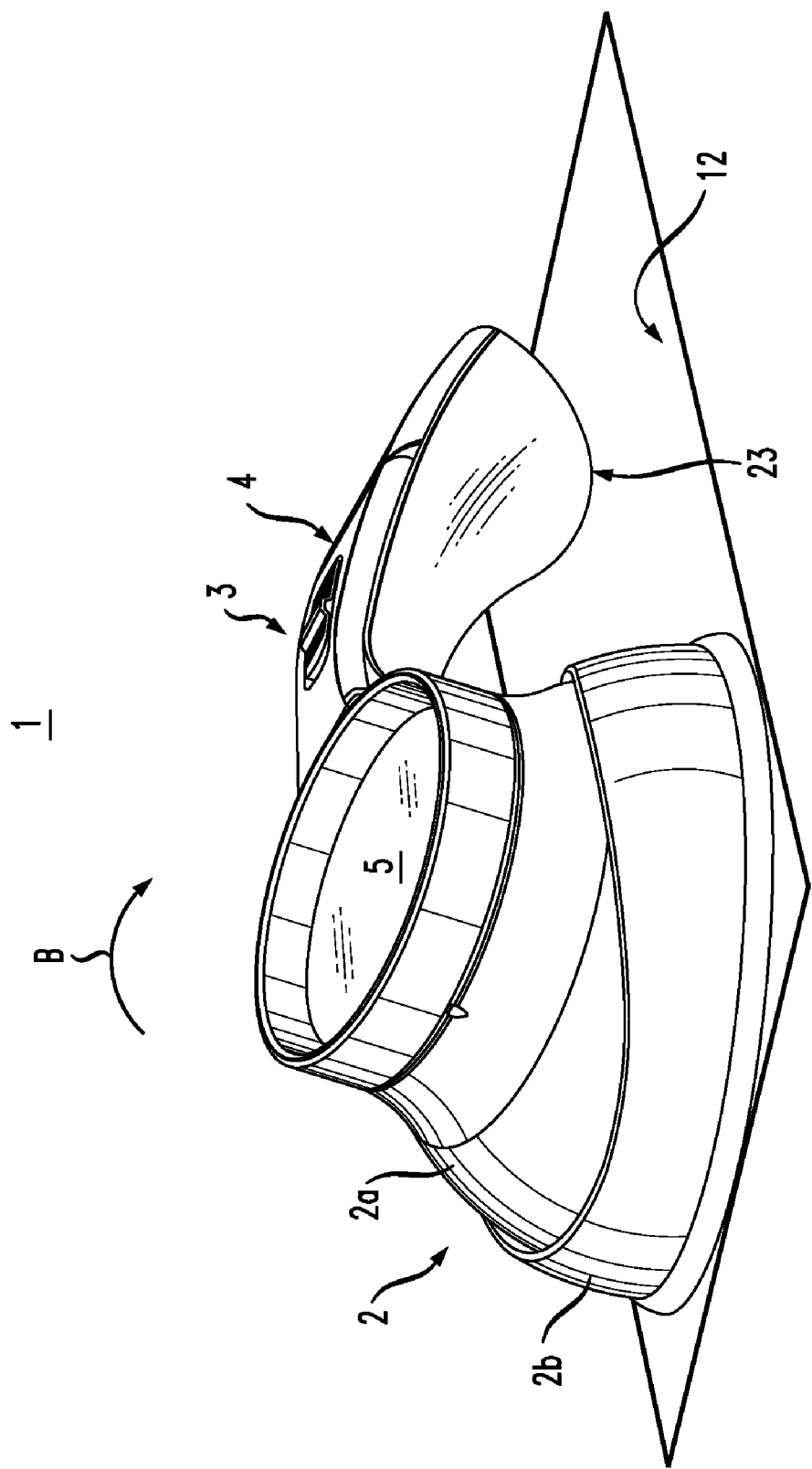
FIG. 3 a perspective view of a stand magnifier in a first end pivot position.
Figure 4:
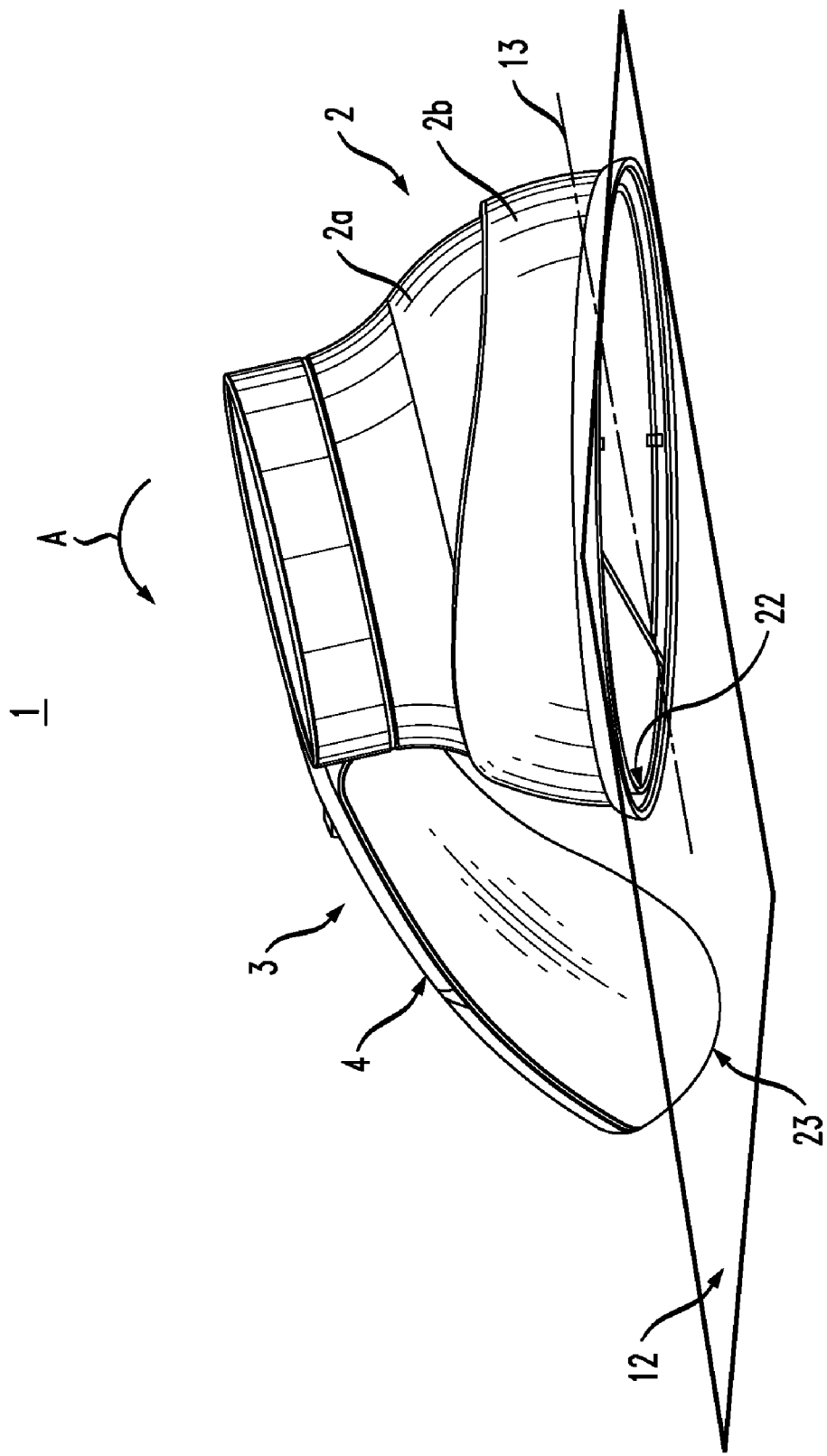
FIG. 4 a perspective view of a stand magnifier according to FIG. 3 in a second end pivot position.

In FIGS. 3 and 4, the reference number 12 depicts the contact surface 12. The stand magnifier 1 according to the invention is pivotable in the assembled state of the hand magnifier 3 and magnifier base 2 relative to the contact surface 12. FIGS. 3 and 4 show the two end positions of the pivotable stand magnifier 1. The pivot axis 13 runs approximately centrally through the magnifier base 2 and directly over the contact surface 12.

The magnifier base 2 is designed in two parts, with the two movable magnifier base parts 2a, 2b being mounted such that they are movable relative to one another and engage one inside the other in an essentially light-tight fashion.

If an embodiment is used that is shown in FIGS. 1 to 4, the basic shape of the magnifier base 2 is round; in this case, an embodiment in the shape of a spherical cap and recess is suitable for the magnifier base parts 2a, 2b.

The pivot axis 13 is formed or defined by a pin 14 and counter means 15 for connection in the magnifier base parts 2a, 2b, cf. FIG. 2.

In the preferred embodiment, the pivoting function of the two magnifier base parts 2a, 2b is provided with a locking mechanism in the form of locking elements (not shown), which are disposed in at least one magnifier base part 2a, 2b. In the first embodiment, the magnifier base 2, originating from a parallel position between the contact surface 12 and the magnifier body 5, may be pivoted in at least two directions A, B. As may be seen from FIGS. 1 and 2, a recess 18 is provided on the upper edge 17 of the magnifier base 2 that corresponds to a placement area 19 of the hand magnifier. Such a placement area 19 may, for example, have a recessed edge that is adapted to the recess 18 of the magnifier base 2. Moreover, the upper edge 17 comprises an annular collar 20 that corresponds to a counter region 21 of the hand magnifier 3.

When the hand magnifier 3 and the magnifier base 2 are in the assembled state, the illumination means 9 disposed on the hand magnifier 3 provides illumination to the contact surface 12 covered by the magnifier base 2 through the recess 18.

The grip 4 of the stand magnifier 1 is formed such that it touches the contact surface 12 with its free grip end region 23, with the free grip end region 23 remaining in contact with the contact surface 12 over the entire pivot motion A, B. Here, it is useful for the free grip end 23 of the grip 4 disposed on the magnifier body 5 to be disposed or supported in the plane of the contact surface 12 in an unwinding manner.

As may be seen from FIG. 4, in this pivot position, the edge region 22 of the pivoted magnifier base part 2a is supported on the contact surface 12 in addition to the lowermost magnifier base part 2b.

The charging jack 11 disposed on the end of the grip 4 is disposed such that a charging plug (not shown) inserted therein would not hinder the unwinding motion of the free grip end 23 on the contact surface 12.

Figure 5:
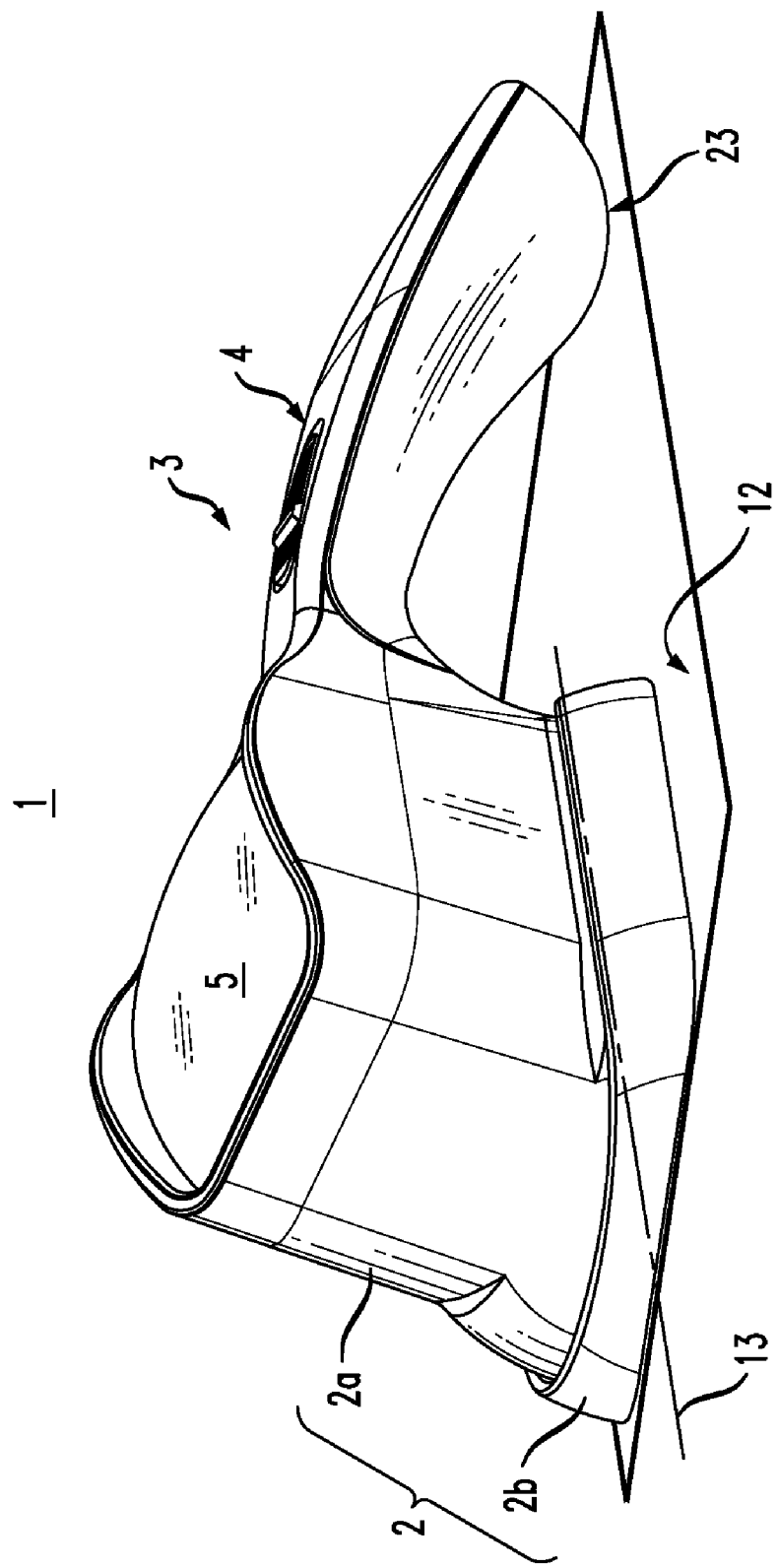
FIG. 5 a perspective view of an alternative embodiment of the stand magnifier in a first end pivot position.
Figure 6:
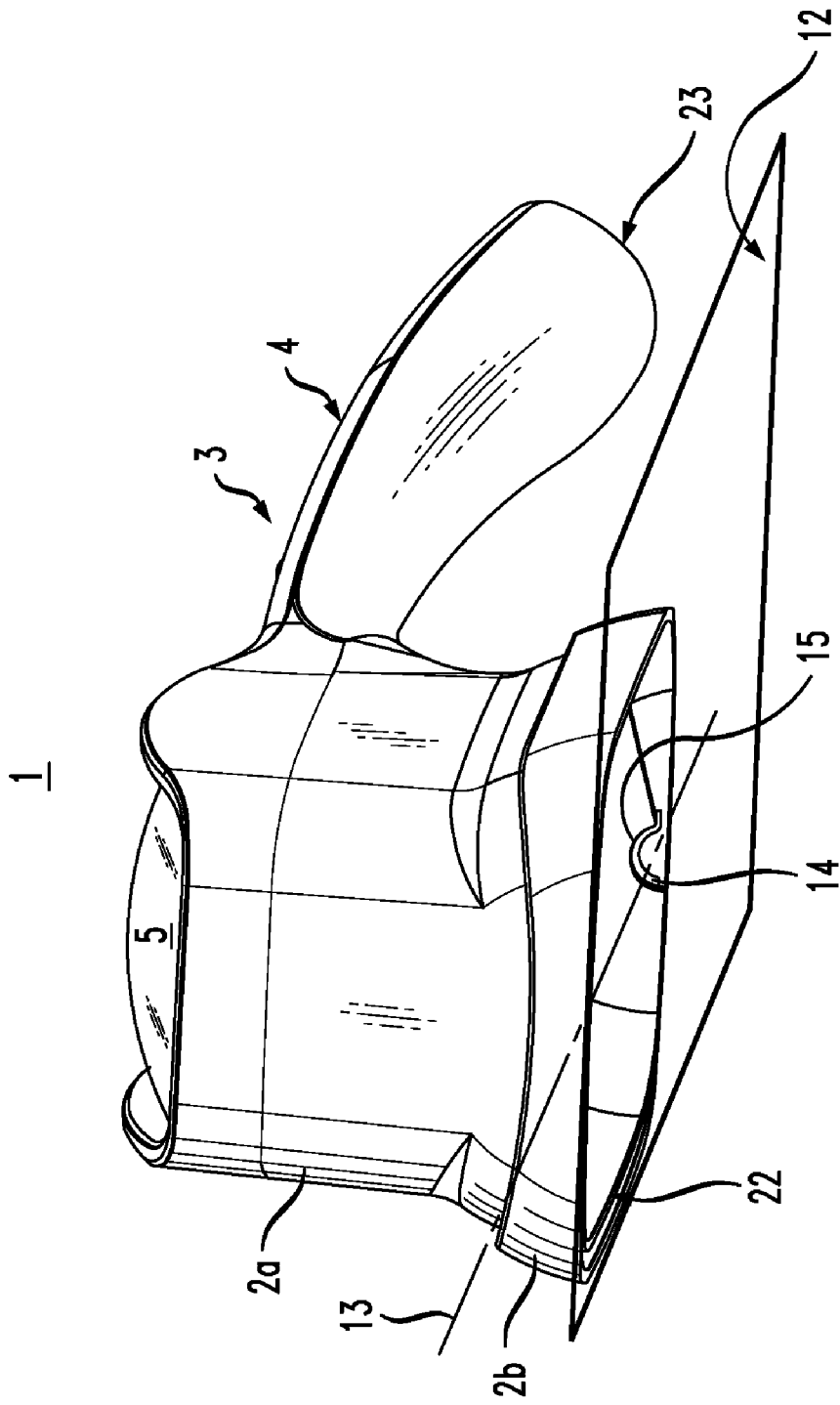
FIG. 6 a perspective view of a stand magnifier according to FIG. 5 in a second end pivot position.

In the first embodiment of the stand magnifier 1 with a round basic shape, the grip 4 may extend radially outwards; in so doing, it is useful for the central longitudinal axis (not shown) of the grip 4 to run parallel to the pivot axis 13. FIGS. 5 and 6 show a second alternative embodiment in which the magnifier base 2 has a rectangular basic shape. In this variation, the central longitudinal axis of the grip 4 forms an acute angle with the pivot axis 13. In addition, it can be seen that the free grip end 23 rests against the contact surface 12 when the hand magnifier is tilted (FIG. 5) and, in a second position in which the magnifier body 5 and the contact surface 12 are parallel to one another (FIG. 6), the grip end 23 is disposed at a distance via the contact surface 12. In addition, if the magnifier base 2 has an essentially rectangular basic shape, it is additionally possible for the pivot axis 13 to run essentially along the diagonals (not shown) of the rectangular basic shape and for the central longitudinal axis of the grip 4 to run flush with the pivot axis 13. Here, it is possible for the grip end 23 to rest on the contact surface 12 in every pivot position of the magnifier base 2.

The illumination means 9 may be activated via the switch 16.

LIST OF REFERENCE NUMBERS

1 Stand magnifier
2 Magnifier base
2a Magnifier base part
2b Magnifier base part
3 Magnifier element/hand magnifier
4 Grip
5 Magnifier body
6 Grip end
7 Magnet
8 Edge region
9 Illumination means
10 Battery/rechargeable battery
11 Charging jack
12 Contact surface
13 Pivot axis
14 Pin
15 Counter means
16 Switch
17 Upper edge
18 Recess
19 Placement area
20 Annular collar
21 Counter region
22 Edge region
23 Free grip end

The invention claimed is

1. A stand magnifier, comprising:
a magnifier base to be placed on reading material or any other surface to be inspected, namely a contact surface; and
a magnifier element having a grip and a magnifying body disposed on one grip end, with the magnifier element being detachably attached to the magnifier base, and being pivotable relative to the contact surface when the magnifier base is attached;
wherein the magnifier base is designed in at least two parts, having at least first and second magnifier base parts mounted one inside the other in a light-tight fashion, and the magnifier element is designed as a separately usable hand magnifier, and the grip is formed such that it touches the contact surface with its free grip end region, and
wherein the free grip end of the grip disposed on the magnifier body is disposed and/or supported in a plane of the contact surface in an unwinding manner.

2. The stand magnifier according to claim 1 wherein the magnifier element comprises an illumination means.

3. The stand magnifier according to claim 2 further comprising a recess provided on an upper edge of the magnifier base that corresponds to a placement area of the magnifier element.

4. The stand magnifier according to claim 3 wherein an annular collar is formed on the upper edge of the magnifier base that corresponds with a counter region of the magnifier element.

5. The stand magnifier according to claim 3 wherein, when the magnifier element and the magnifier base are in their assembled state, the illumination means disposed on the magnifier element illuminates the contact surface through the recess of the magnifier base.

6. The stand magnifier according to claim 2 further comprising a charging jack disposed on the free grip end region of the grip, wherein the charging jack is positioned in such a way that a charging plug inserted therein does not hinder the unwinding movement of the free grip end on the contact surface.

7. The stand magnifier according to claim 6 wherein a charging plug is inserted into the charging jack such that it points diagonally upwards.

8. The stand magnifier according to claim 2 wherein the free grip end rests against the contact surface when the magnifier element is tilted and, in a second setting, the magnifier body floats in a parallel position relative to the contact surface.

9. The stand magnifier according to claim 2 wherein the free grip end rests against the contact surface in every pivot position of the magnifier base.

10. The stand magnifier according to claim 1 wherein a pivot axis runs through the magnifier base in a central manner and is disposed directly above the contact surface.

11. The stand magnifier according to claim 10 wherein the base has a round basic shape and the central longitudinal axis of the grip is disposed parallel to the pivot axis.

12. The stand magnifier according to claim 1 wherein the detachable connection between the magnifier base and the magnifier element is formed by a snap-lock connection.

13. The stand magnifier according to claim 1 wherein the detachable connection between the magnifier base and the magnifier element is formed by a plurality of magnets coupled in a mutually attracted fashion in an edge region of the magnifier body.

14. The stand magnifier according to claim 13 wherein the plurality of magnets comprises two to six magnet pairs.

15. The stand magnifier according to claim 14 wherein the magnet pairs are disposed equidistantly.

16. The stand magnifier according to claim 1 wherein the at least first and second magnifier base parts, that are pivotable relative to one another, are designed in the shape of a spherical cap and spherical recess.

17. The stand magnifier according to claim 16 wherein the at least first and second magnifier base parts, movable relative to one another, may be pivoted one into the other in an at least partially flush fashion.

18. The stand magnifier according to claim 10 wherein the pivot axis is formed or defined by pins and counter means in the respective at least first and second magnifier base parts that are pivotable relative to one another.

19. The stand magnifier according to claim 1 wherein, for the purpose of pivoting, locking elements are disposed on at least one of the at least first and second magnifier base parts.

20. The stand magnifier according to claim 1 wherein the magnifier base, originating from a parallel position between the contact surface and magnifier body, may be pivoted in at least two directions.

21. The stand magnifier according to claim 1 wherein, in at least one pivot position next to the lowermost at least second magnifier base part, at least one edge region of the additional pivoted at least first magnifier base part, is supported on the contact surface.

22. The stand magnifier according to claim 1 wherein the base has an approximately round or elliptical basic shape and the grip extends radially outwards.

23. The stand magnifier according to claim 1 wherein the magnifier base has a rectangular basic shape and the central longitudinal axis of the grip forms an acute angle with a pivot axis or is disposed parallel thereto.

24. A stand magnifier, comprising:
a magnifier base to be placed on reading material or any other surface to be inspected, namely a contact surface;
a magnifier element comprising: an illumination means; a grip; and a magnifying body disposed on one grip end, with the magnifier element being detachably attached to the magnifier base, and being pivotable relative to the contact surface when the magnifier base is attached; and
a charging jack disposed on the free grip end region of the grip, wherein the charging jack is positioned in such a way that a charging plug inserted therein does not hinder the unwinding movement of the free grip end on the contact surface,
wherein the magnifier base is designed in at least two parts, having at least first and second magnifier base parts mounted one inside the other in a light-tight fashion, and the magnifier element is designed as a separately usable hand magnifier, and the grip is formed such that it touches the contact surface with its free grip end region.

25. The stand magnifier according to claim 24 wherein a charging plug is inserted into the charging jack such that it points diagonally upwards.

26. A stand magnifier, comprising:
a magnifier base to be placed on reading material or any other surface to be inspected, namely a contact surface; and
a magnifier element comprising: an illumination means; a grip; and a magnifying body disposed on one grip end, with the magnifier element being detachably attached to the magnifier base, and being pivotable relative to the contact surface when the magnifier base is attached;
wherein the magnifier base is designed in at least two parts, having at least first and second magnifier base parts mounted one inside the other in a light-tight fashion, and the magnifier element is designed as a separately usable hand magnifier, and the grip is formed such that it touches the contact surface with its free grip end region, and
wherein the free grip end rests against the contact surface when the magnifier element is tilted and, in a second setting, the magnifier body floats in a parallel position relative to the contact surface.

27. A stand magnifier, comprising:
a magnifier base to be placed on reading material or any other surface to be inspected, namely a contact surface; and
a magnifier element comprising: an illumination means; a grip; and a magnifying body disposed on one grip end, with the magnifier element being detachably attached to the magnifier base, and being pivotable relative to the contact surface when the magnifier base is attached;
wherein the magnifier base is designed in at least two parts, having at least first and second magnifier base parts mounted one inside the other in a light-tight fashion, and the magnifier element is designed as a separately usable hand magnifier, and the grip is formed such that it touches the contact surface with its free grip end region, and
wherein the free grip end rests against the contact surface in every pivot position of the magnifier base.

* * * * *